(12) United States Patent
Daichou et al.

(10) Patent No.: US 7,210,823 B2
(45) Date of Patent: May 1, 2007

(54) LAMP REFLECTOR INCLUDING BULK MOLDING COMPOUND

(75) Inventors: Hisayoshi Daichou, Shizuoka (JP); Daisuke Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 333 days.

(21) Appl. No.: 10/688,933

(22) Filed: Oct. 21, 2003

(65) Prior Publication Data
US 2004/0085772 A1   May 6, 2004

(30) Foreign Application Priority Data
Oct. 21, 2002   (JP)   ............................ P.2002-305274

(51) Int. Cl.
*F21V 7/22*   (2006.01)
(52) U.S. Cl. ...................... 362/341; 428/325; 428/406; 362/297
(58) Field of Classification Search ................ 362/341, 362/514, 516, 609, 616, 629; 428/325, 404, 428/406
See application file for complete search history.

(56) References Cited

U.S. PATENT DOCUMENTS

| 3,316,139 | A | * | 4/1967 | Alford et al. | ............... 442/249 |
| 5,348,763 | A | * | 9/1994 | Laroche | ...................... 427/137 |
| 6,000,816 | A | * | 12/1999 | Serizawa et al. | ........... 362/297 |
| 6,030,673 | A | * | 2/2000 | Andersen et al. | .......... 428/36.4 |
| 6,599,444 | B2 | * | 7/2003 | Burnell-Jones | ........ 252/301.36 |
| 6,756,427 | B2 | * | 6/2004 | Maeda | ........................ 523/219 |

FOREIGN PATENT DOCUMENTS

DE   689 24 801 T2   7/1996

* cited by examiner

*Primary Examiner*—Sandra O'Shea
*Assistant Examiner*—Ismael Negron
(74) *Attorney, Agent, or Firm*—Sughrue Mion, PLLC

(57) ABSTRACT

A lamp reflector having a substrate prepared by injection molding a bulk molding compound (BMC). The BMC has a matrix resin mainly including: an unsaturated polyester resin and glass fiber as a reinforcing inorganic filler, and hollow glass spheres in an amount of 10 to 40% by volume based on the BMC as an additional inorganic filler.

9 Claims, 2 Drawing Sheets

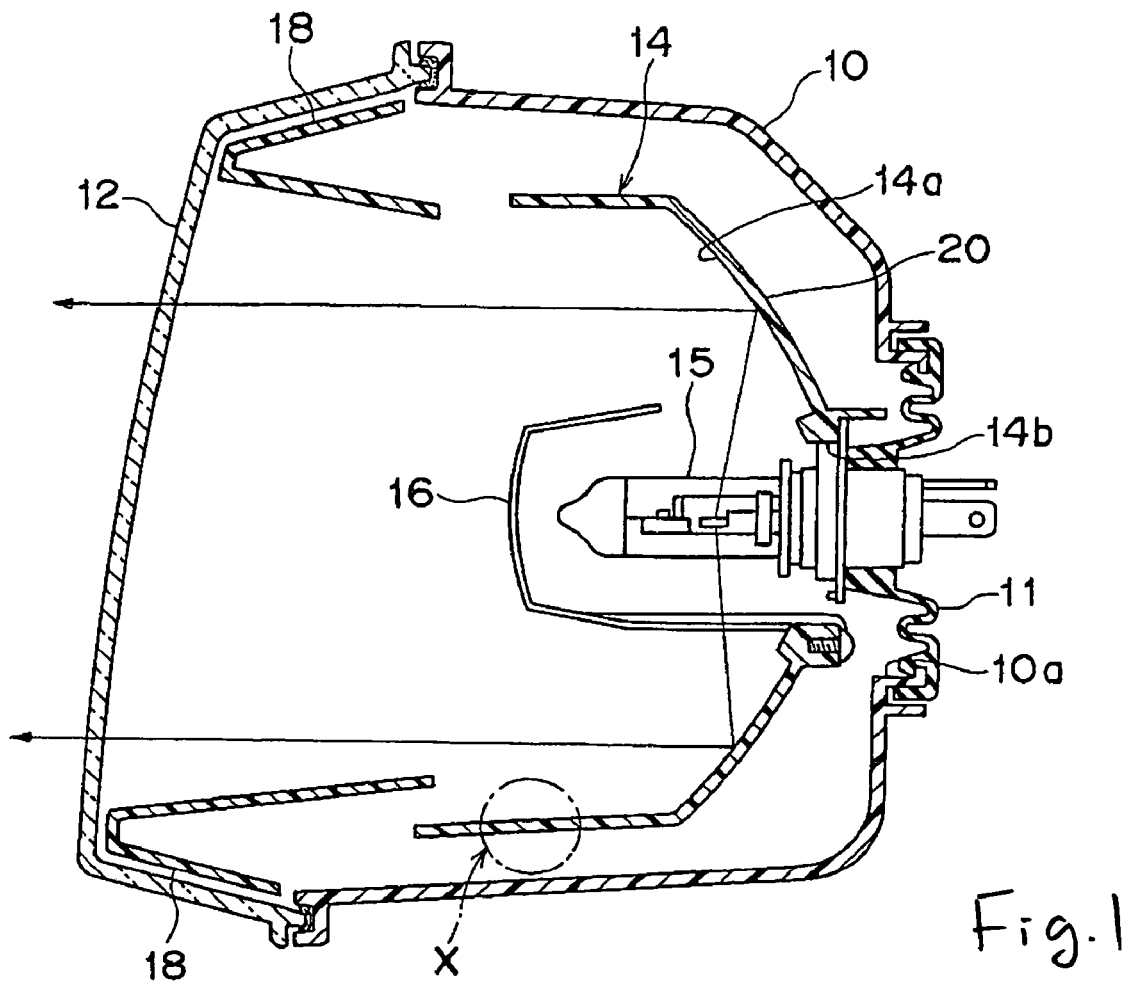
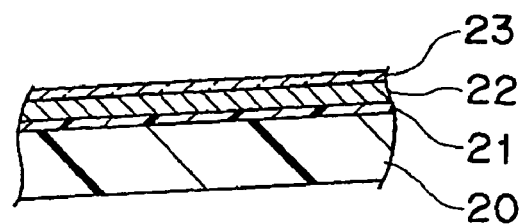

LAMP REFLECTOR INCLUDING BULK MOLDING COMPOUND

BACKGROUND OF THE INVENTION

1. Field of the Invention

This invention relates to a lamp reflector having an aluminum-deposited mirror surface particularly suitable for headlights, fog lights, etc. mounted on motorcycles, automobiles and other vehicles. More particularly, it relates to a lamp reflector having a substrate made by injection molding a bulk molding compound (hereinafter abbreviated as BMC) comprising a matrix resin mainly comprising an unsaturated polyester resin and glass fiber as an inorganic filler. The matrix resin comprises an unsaturated polyester, a polymerizable compound having a polymerizable double bond in the molecule thereof which serves as a crosslinking agent for curing the unsaturated polyester, and a thermoplastic resin which serves for controlling cure shrinkage of the unsaturated polyester.

2. Description of the Related Art

In the field of lamp reflectors for use in headlights and fog lights of vehicles, it is well known to use a substrate formed by injection molding a BMC comprising a matrix resin mainly comprising an unsaturated polyester resin and inorganic fillers, such as glass fiber (a reinforcing material), particulate fillers, and whiskers. The substrate made from a BMC is known for dimensional stability (molding precision as designed with reduced influences of heat shrinkage), heat resistance, rigidity, and economy.

However, containing reinforcing fillers such as glass fiber and whiskers, a BMC is heavy, having a specific gravity of 1.8 to 2.1, which is almost double that of general thermoplastic resin molding materials. So are lamp reflectors obtained therefrom. Heavy lamp reflectors result in increased fuel consumption of vehicles, which does not meet the recent social demand for energy saving.

The present inventors sought for possibility of reducing the weight of BMC molded parts while retaining their main characteristics except economy, such as dimensional stability, heat resistance and rigidity. They noted that glass fiber used in a BMC is a reinforcing component indispensable for retaining the main characteristics of a BMC molded part, whereas inorganic fillers other than glass fiber are not so contributory as glass fiber to secure the main characteristics and are not seen as indispensable. It was confirmed that replacing part of an inorganic filler other than glass fiber with hollow glass spheres (glass balloons filled with gas and having a small specific gravity) made a good effect on BMC weight reduction.

However, use of hollow glass spheres in a BMC gave rise to a new problem that the glass spheres are collapsed under shearing force applied in injection molding, resulting in a short shot, a failure to achieve sufficient weight reduction, or a reduction in rigidity.

SUMMARY OF THE INVENTION

The inventors have conducted intensive experimentation seeking for an optimum compounding ratio of hollow glass spheres in a BMC at which the hollow glass spheres successfully contributes to weight reduction of a BMC molded part without being collapsed during injection molding nor impairing the main characteristics of a BMC molded part (i.e., dimensional stability, heat resistance, and rigidity). As a result, they have found such an optimum compounding ratio and thus reached the present invention.

An object of the present invention is to provide a lamp reflector of which the substrate prepared from a BMC has a reduced weight and yet retains the main characteristics expected of a BMC injection molded part by incorporating as an inorganic filler a specific amount of hollow glass spheres into a BMC.

The invention provides a lamp reflector having a substrate prepared by injection molding a BMC comprising a matrix resin mainly comprising an unsaturated polyester resin and glass fiber as a reinforcing inorganic filler, the BMC further comprising hollow glass spheres in an amount of 10 to 40% by volume based on the BMC as an additional inorganic filler.

The matrix resin which can be used in the invention comprises an unsaturated polyester, a polymerizable compound having a polymerizable double bond in the molecule thereof which serves as a crosslinking agent for curing the unsaturated polyester, and a thermoplastic resin which serves for controlling curing shrinkage of the unsaturated polyester.

The unsaturated polyester resin is preferably one providing a cured product having a glass transition temperature of 150° C. or higher, particularly 160° C. or higher. The polymerizable compound (monomer) includes styrene, vinyltoluene, divinylbenzene, methyl methacrylate, p-methylstyrene, diallyl phthalate, and diallyl isophthalate. The monomers can be used either individually or as a mixture of two or more thereof. The thermoplastic resin includes styrene copolymers, polyethylene, polyvinyl chloride, polyvinyl acetate, polymethyl methacrylate, methyl methacrylate copolymers, modified ABS resins, polycaprolactone, and modified polyurethane. Acrylic homo- or copolymer resins including polymethyl methacrylate and methyl methacrylate copolymers and vinyl acetate resins including polyvinyl acetate and styrene-vinyl acetate copolymers are preferred for their capability of dispersing inorganic fillers, low shrinkage, and rigidity. The matrix resin usually comprises 30 to 60 parts, preferably 35 to 50 parts, by weight of the unsaturated polyester; 25 to 60 parts, preferably 37 to 50 parts, by weight of the polymerizable compound; and 8 to 35 parts, preferably 10 to 25 parts, by weight of the thermoplastic resin per 100 parts by weight of the matrix resin.

If desired, the BMC can contain other known inorganic fillers, such as particulate fillers and whiskers, in addition to the reinforcing glass fiber and the hollow glass spheres.

A hollow glass spheres content less than 10% by volume produces an insubstantial effect on weight reduction of a BMC molded part only to provide a heavy lamp reflector (see Comparative Examples 1 and 2 hereinafter given). If the hollow glass spheres content exceeds 40% by weight, the BMC hardly secures dimensional stability, and the resulting BMC molded part has low rigidity (flexural modulus) and low impact resistance (see Comparative Example 3). From the standpoint of lightness, rigidity, impact resistance, and dimensional stability of a BMC molded part, the proportion of the hollow glass spheres in the BMC should fall within a range of from 10 to 40% by volume.

It is preferred that the MBC has a total inorganic filler to matrix resin ratio of 1.0 to 2.5 by volume. With this ratio being smaller than 1.0, a BMC molded part obtained from such a matrix-rich BMC has improved surface smoothness but tends to be insufficient in rigidity (flexural modulus) and heat resistance (see Comparative Example 4). Besides, the BMC exhibit too high flowability (too low viscosity), tending to have insufficient dimensional stability, and can cause voids or burns which affect surface smoothness of a BMC molded part.

A BMC having the total inorganic filler to matrix resin volume ratio exceeding 2.5 produces an injection molded part with high rigidity and high heat resistance owing to the high inorganic filler content. However, because of insufficient wettability of the inorganic fillers by the matrix resin, the resulting BMC molded part tends to have poor impact resistance or reduced releasability from the mold, making molding difficult. Further, such a filler-rich BMC has reduced flowability (i.e., increased viscosity). This can invite collapse of the hollow glass spheres during injection molding, resulting in a failure to achieve weight reduction as expected. Such a highly viscous molding material tends to have unstable molding properties, often causing short shots. Therefore, from the viewpoint of dimensional stability, heat resistance, rigidity, impact resistance, molding properties, and weight reduction, a preferred volume ratio of the total inorganic filler to the matrix resin ranges from 1.0 to 2.5.

It is preferred that the hollow glass spheres to be used have an average diameter of 15 to 45 µm. Hollow glass spheres with a larger diameter have a smaller specific gravity, which is effective for weight reduction of a BMC molded part. Nevertheless, such large glass spheres as have an average diameter larger than 45 µm are liable to become foreign to the matrix, and the resulting BMC molded part tends to be insufficient in rigidity (flexural modulus), flexural strength, releasability from mold, and dimensional stability (see Comparative Example 7). In addition, too large hollow glass spheres have greatly reduced pressure resistance and are collapsed easily during injection molding. If collapsed, the hollow glass spheres produce only a reduced effect on weight reduction and make molding unstable, causing short shots or other molding defects.

On the other hand, hollow glass spheres having a smaller diameter are more effective in improving dimensional stability, surface smoothness, and rigidity but have an increased specific gravity. In particular, hollow glass spheres as small as less than 15 µm in average diameter have a specific gravity of 1.1 or smaller, giving a BMC molded part with a specific gravity exceeding 1.7 (see Comparative Example 6, in which the BMC molded part has a specific gravity of 1.75, indicating a failure to achieve weight reduction). Thus, for obtaining satisfactory results in weight reduction, dimensional stability, rigidity, flexural strength, molding properties (releasability and freedom from short shots), and surface smoothness, a preferred average diameter of the hollow glass spheres is from 15 to 45 µm as will be testified in Examples and Comparative Examples hereinafter described.

BRIEF DESCRIPTION OF THE DRAWINGS

FIG. 1 is a cross-section of a headlight for a vehicle using a lamp reflector according to the present invention.

FIG. 2 is an enlarged schematic cross-section of the lamp reflector marked with X in FIG. 1.

DESCRIPTION OF THE PREFERRED EMBODIMENTS

Figure 3:
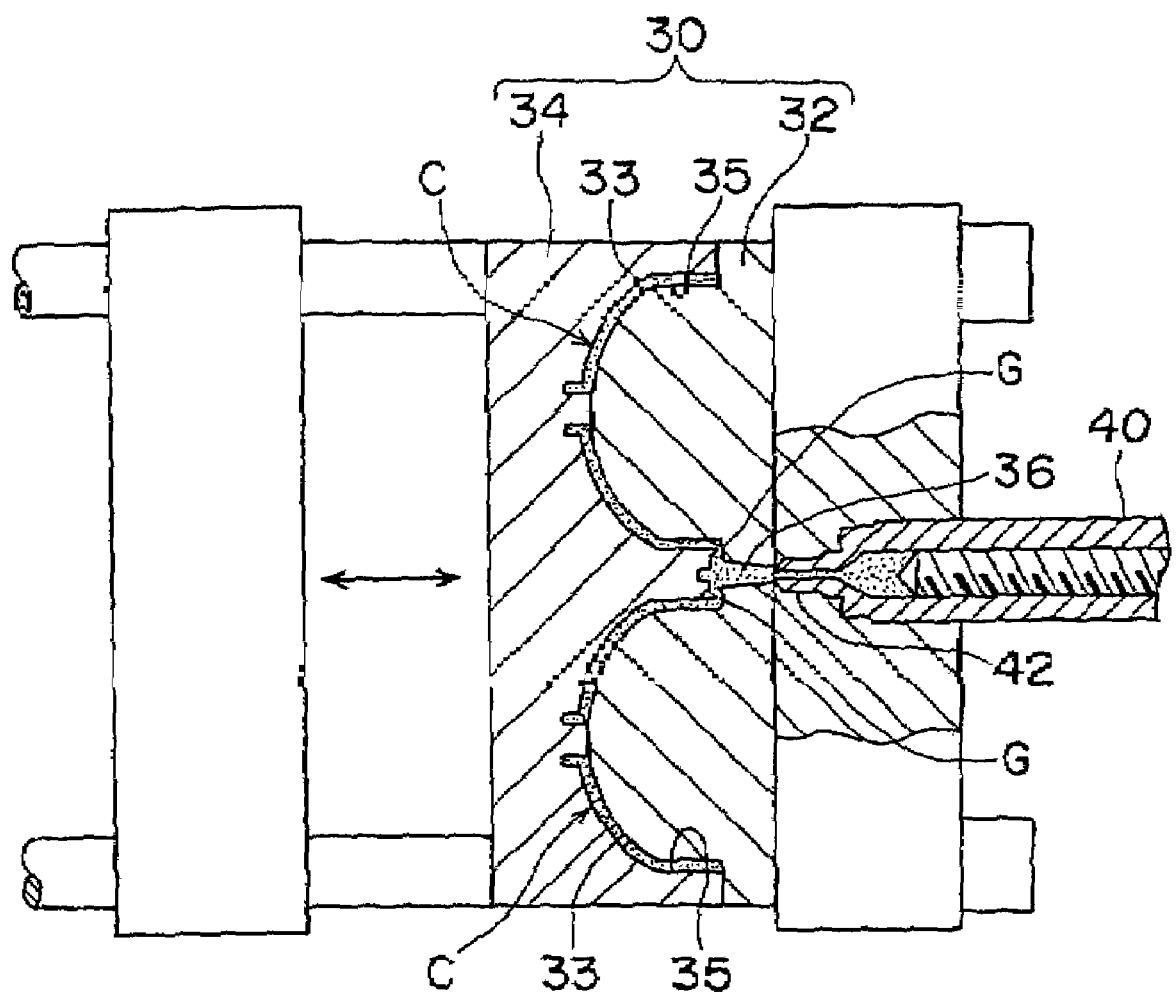
FIG. 3 illustrates an injection molding machine for producing BMC molded parts, with part cut away to show a cross-sectional view.

In the following the lamp reflector of the invention will be described with reference to preferred embodiments of the invention.

FIGS. 1 through 3 show an embodiment of the present invention. FIG. 1 is a cross-section of a headlight for a vehicle using a lamp reflector according to the present invention. FIG. 2 is an enlarged schematic cross-section of the lamp reflector marked with X in FIG. 1. FIG. 3 illustrates an injection molding machine for producing BMC molded parts, with part cut away to show a cross-section.

The headlight shown in FIG. 1 comprises a bowl-shaped lamp shell 10 having a front opening and a rear opening 10a, a front lens 12 attached to the front rim of the lamp shell 10, a lamp reflector 14b having a front opening and a rear opening 14b disposed in a lighting chamber defined by the lamp shell 10 and the front lens 12, and a bulb 15 (a light source) inserted through the rear opening 14b. Numeral 16 indicates a shade provided to cover the bulb 15 to make a cutline (a light-shadow borderline). The opening 10a of the shell 10, through which bulbs are exchanged, is closed by a rubber cover 11. Numeral 18 is an extension reflector for covering the gap between the reflector 14 and the lamp shell 10.

The reflector 14 has on its inner side a paraboloidal effective reflective area 14a. The effective reflective area 14a is formed by vacuum depositing aluminum on the inner side of a bowl-shaped substrate 20 produced by injection molding a BMC (the substrate will hereinafter be referred to as a "BMC molding part"). As shown in FIG. 1, light emitted from the bulb 15 is reflected on the effective reflective area 14a of the reflector 14, led forward, and transmitted through the front lens 12 to give light beams with a luminous intensity distribution. The BMC molded part 20 of the reflector 14 must have heat resistance withstanding the heat generated from the bulb 15 and surface smoothness sufficient to provide the effective reflective area 14a by aluminum deposition.

The reflector 14 is supported only at its rear end by an aiming mechanism (not shown). On the outer wall of the reflector 14 opposite to the effective reflective area are imposed loads such as a bending moment due to its own weight and the weight of the bulb 15. Therefore, the reflector 14 must have sufficient rigidity and impact resistance not to be deformed by its own weight and external loads such as vibration. The reflector 14 is also required to have flexural strength enough to restore in the absence of the outer loads.

As shown in FIG. 2, the reflector 14 basically comprises, in the order described, a BMC molded part (substrate) 20 prepared by injection molding a BMC, an undercoating layer 21 for providing a smooth surface with high precision, an aluminum layer formed by vacuum deposition, and a protective topcoat 23 made of a transparent material.

The BMC used to make the BMC molding part 20 is a molding compound comprising a matrix resin, glass fiber as a reinforcing material, hollow glass spheres as an inorganic filler and, if desired, other inorganic fillers such as whiskers and particulate fillers.

The matrix resin of the BMC comprises an unsaturated polyester as a base resin, a polymerizable compound having a polymerizable double bond in the molecule thereof as a crosslinking agent for curing the unsaturated polyester, and a thermoplastic resin for controlling curing shrinkage of the unsaturated polyester. The unsaturated polyester resin is preferably one providing a cured product having a glass transition temperature of 150° C. or higher, particularly 160° C. or higher. The polymerizable compound (monomer) includes styrene, vinyltoluene, divinylbenzene, methyl methacrylate, p-methylstyrene, diallyl phthalate, and diallyl isophthalate. The monomers can be used either individually or as a mixture of two or more thereof. The thermoplastic resin includes styrene copolymers, polyethylene, polyvinyl chloride, polyvinyl acetate, polymethyl methacrylate, methyl methacrylate copolymers, modified ABS resins, polycaprolactone, and modified polyurethane. Acrylic homo- or copolymer resins including polymethyl methacrylate and methyl methacrylate copolymers and vinyl acetate resins including polyvinyl acetate and styrene-vinyl acetate copolymers are preferred for their dispersibility, low shrinkage, and rigidity. The matrix resin usually comprises 30 to 60 parts, preferably 35 to 50 parts, by weight of the unsaturated polyester; 25 to 60 parts, preferably 37 to 50 parts, by weight of the polymerizable compound; and 8 to 35 parts, preferably 10 to 25 parts, by weight of the thermoplastic resin per 100 parts by weight of the matrix resin.

The hollow glass spheres which can be used in the invention include those made of chemically stable insoluble glass and having an average particle size of 70 μm or smaller, which are available under trade names Scotchlite, Cel-Star, etc.

Materials of whiskers include calcium carbonate, calcium silicate, aluminum borate, potassium titanate, and magnesium sulfate. The particulate fillers include calcium carbonate, mica, talc, graphite, and aluminum hydroxide. For price reduction, the amount of the whiskers or particulate fillers could be increased to minimize use of the hollow glass spheres, which are more expensive than whiskers or particulate fillers, as long as the characteristics required of the BMC molded part 20 may be secured.

The proportion of the hollow glass spheres in the BMC is adjusted to 10 to 40% by volume for achieving weight reduction while retaining rigidity, impact resistance and dimensional stability of the resulting BMC molded part 20.

A hollow glass spheres content less than 10% by volume produces an insubstantial effect on weight reduction of the BMC molded part 20 only to provide a heavy lamp reflector (see Comparative Examples 1 and 2). If the hollow glass spheres content exceeds 40% by weight, the BMC hardly secures dimensional stability, and the resulting BMC molded part 20 has low rigidity (flexural modulus) and low impact resistance (see Comparative Example 3). From the standpoint of lightness, rigidity, impact resistance, and dimensional stability of the BMC molded part 20, the proportion of the hollow glass spheres should fall within a range of from 10 to 40% by volume.

It is preferred that the BMC has a total inorganic filler to matrix resin ratio of 1.0 to 2.5 by volume so as to provide a BMC molded part 20 with satisfactory rigidity and dimensional stability (satisfactory conditions of the surface as designed on which aluminum is to be deposited). With this ratio being smaller than 1.0, a BMC molded part obtained from such a matrix-rich BMC has improved surface smoothness but tends to be insufficient in rigidity (flexural modulus) and heat resistance (see Comparative Example 4). Besides, the BMC exhibits too high flowability (too low viscosity), tending to have insufficient dimensional stability, and can cause voids or burns which affect surface smoothness.

A BMC having a total inorganic filler to matrix resin volume ratio exceeding 2.5 produces a BMC molded part 20 with high rigidity and high heat resistance owing to the high inorganic filler content. However, because of insufficient wettability of the inorganic fillers by the matrix resin, the resulting BMC molded part 20 tends to have poor impact resistance or reduced releasability from mold, making molding difficult. Further, the filler-rich BMC has reduced flowability (i.e., increased viscosity). This can invite collapse of the hollow glass spheres during injection molding, resulting in a failure to achieve weight reduction as expected. Such a highly viscous molding material tends to have unstable molding performance, often causing short shots. Therefore, from the viewpoint of dimensional stability, heat resistance, rigidity, impact resistance, molding properties, and weight reduction, a preferred volume ratio of the total inorganic filler to the matrix resin ranges from 1.0 to 2.5.

It is preferred that the hollow glass spheres to be used have an average diameter of 15 to 45 μm to improve the dimensional stability, rigidity, and lightness of the BMC molded part 20. Hollow glass spheres with a larger diameter have a smaller specific gravity, which is effective for weight reduction of a BMC molded part. Nevertheless, such large glass spheres as have an average diameter larger than 45 μm are liable to become foreign to the matrix, and the resulting BMC molded part 20 tends to be insufficient in rigidity (flexural modulus), flexural strength, releasability from mold, and dimensional stability (see Comparative Example 7). In addition, too large hollow glass spheres have greatly reduced pressure resistance and are collapsed easily during injection molding. If collapsed, the hollow glass spheres produce only a reduced effect on weight reduction and make molding unstable, causing short shots or other molding defects.

On the other hand, hollow glass spheres having a smaller diameter are more effective in improving dimensional stability, surface smoothness, and rigidity but have an increased specific gravity. In particular, hollow glass spheres as small as less than 15 μm in average diameter have a specific gravity of 1.1 or greater, giving a BMC molded part 20 with a specific gravity exceeding 1.7 (see Comparative Example 6, in which the BMC molded part has a specific gravity of 1.75). It is difficult to achieve weight reduction with such hollow glass spheres. Thus, for obtaining satisfactory results in weight reduction, dimensional stability, rigidity, flexural strength, molding properties (releasability and freedom from short shots), and surface smoothness, a preferred average diameter of the hollow glass spheres is from 15 to 45 μm as will be demonstrated in Examples and Comparative Examples hereinafter described.

In the following an injection molding machine which can be used to produce the BMC molded part 20 will be described by referring to FIG. 3.

The injection molding machine shown in FIG. 3 has a mold 30 composed of a fixed half 32 through which a BMC is injected and a movable half 34 which is moved to join with or separate from the fixed half 32. The halves 32 and 34 each have molding surfaces 33 and 35, respectively. Joined and clamped, the halves 32 and 34 form cavities C defined by the molding surfaces 33 and 35. The fixed half 32 has a film gate G connecting the cavities C and a sprue 36. A BMC is fed from a nozzle 42 of a cylinder 40 into the cavities C through the sprue 36 and the film gate G and heat cured to produce BMC molded parts 20.

There is a fear that the hollow glass spheres in the BMC may be collapsed by the shearing pressure applied during injection molding, which can result in a short shot. To avoid this, the hollow glass spheres to be used in the BMC should have a pressure strength of at least 40 MPa with an average diameter of 15 to 45 μm.

It is desirable that the resin temperature in the cylinder 40 be higher than that generally adopted for conventional BMCs to smoothen the flow of the BMC thereby reducing the shearing pressure. That is, the resin temperature is preferably 30 to 40° C. while conventional BMCs are injected at room temperature.

It is in the vicinity of the gate G that receives the highest shearing pressure during injection molding. Therefore, the gate G is designed to have an opening size (cross-sectional area) of 2 mm by 20 mm or larger, and each of the cavities C is designed to form a BMC molded part with a thickness of at least 1.5 mm, so that the injection shearing pressure exerted in the vicinity of the gate G may not exceed the pressure resistance limit (40 MPa) of the hollow glass spheres.

The present invention will now be illustrated in greater detail with reference to Examples in comparison with Comparative Examples.

EXAMPLES 1 TO 3 AND COMPARATIVE EXAMPLES 1 TO 5

A BMC molded part was produced by injection molding a BMC having a composition shown in Tables 1 and 2. Tables 1 and 2 also show the volume ratio of hollow glass spheres (abbreviated as HGS) to the whole BMC, the volume ratio of the total inorganic filler to the matrix resin, and the characteristics of the resulting BMC molded part.

Abbreviations used in Tables shown below have the following meanings.

TABLE 1

|  | Target Range | Example 1 | | Example 2 | | Example 3 | |
| --- | --- | --- | --- | --- | --- | --- | --- |
| Volume Ratio of HGS (vol %) | 10 to 40 | 31 | | 37 | | 26 | |
| Inorganic Filler/Resin | 1 to 2.5 | 1.84 | | 2.19 | | 1.18 | |
| BMC Composition (wt %) | | | | | | | |
| Unsaturated Polyester | | IPA/Man/PG | 11% | IPA/Man/PG | 10% | IPA/Man/PG | 11% |
| Thermoplastic Resin | | PMMA | 4% | PMMA | 4% | PMMA | 13% |
| Crosslinking Agent | | styrene | 11% | styrene | 10% | styrene | 11% |
| HGS (specific gravity: 0.6) | | avg. D: 30 μm | 13% | avg. D: 30 μm | 15% | avg. D: 30 μm | 11% |
| Calcium Carbonate Particles | | avg. size: 6 μm | 44% | avg. size: 6 μm | 45% | avg. size: 6 μm | 27% |
| Glass Fiber | | 13 μm (D) × 6 mm (L) | 15% | 13 μm (D) × 6 mm (L) | 14% | 13 μm (D) × 6 mm (L) | 25% |
| Catalyst | | TBPB | 1% | TBPB | 0% | TBPB | 1% |
| Internal Parting Agent | | Zn-St | 1% | Zn-St | 1% | Zn-St | 1% |
| Characteristics | | | | | | | |
| Flexural Strength (MPa) | ≧60 | 75 | P | 70 | P | 65 | P |
| Flexural Modulus (GPa) | ≧9 | 10.5 | P | 10.3 | P | 9.1 | P |
| Charpy Impact Strength (kJ/m$^2$) | ≧5 | 7 | P | 6.0 | P | 5.4 | P |
| Mold Releasability | no sticking | no abnormality | P | no abnormality | P | no abnormality | P |
| Molding Shrinkage (%) | ≦0.1 | 0.08 | P | 0.06 | P | 0.06 | P |
| Specific Gravity | ≦1.7 | 1.42 | P | 1.41 | P | 1.40 | P |
| Ignition Loss (g/m$^2$ · 180° C.) | ≦0.60 | 0.33 | P | 0.32 | P | 0.40 | P |

BMC Composition:
IPA/Man/PG: polycondensation product of isophthalic acid, maleic acid anhydride, and propylene glycol
PMMA: polymethyl methacrylate
TBPB: t-butyl peroxybenzoate
Zn-St: zinc stearate
avg. (average) D: average diameter
Characteristics:
P: passed
F: Failed

TABLE 2

|  | Comparative Example 1 | | Comparative Example 2 | | Comparative Example 3 | | Comparative Example 4 | | Comparative Example 5 | |
| --- | --- | --- | --- | --- | --- | --- | --- | --- | --- | --- |
| Volume Ratio of HGS (vol %) | 0 | | 9.5 | | 40.5 | | 23 | | 36 | |
| Inorganic Filler/Resin | 1.30 | | 1.45 | | 2.13 | | 0.97 | | 2.52 | |
| BMC Composition (wt %) | | | | | | | | | | |
| Unsaturated Polyester | IPA/Man/PG | 9% | IPA/Man/PG | 10% | IPA/Man/PG | 11% | IPA/Man/PG | 11% | IPA/Man/PG | 9% |
| Thermoplastic Resin | PMMA | 7% | PMMA | 4% | PMMA | 4% | PMMA | 15% | PMMA | 3% |
| Crosslinking Agent | styrene | 9% | styrene | 10% | styrene | 11% | styrene | 11% | styrene | 9% |
| HGS (specific gravity: 0.6) | average D: 30 μm | 0% | average D: 30 μm | 3% | average D: 30 μm | 18% | average D: 30 μm | 10% | average D: 30 μm | 14% |
| Calcium Carbonate Particles | avg. size: 6 μm | 57% | avg. size: 6 μm | 58% | avg. size: 6 μm | 40% | avg. size: 6 μm | 25% | avg. size: 6 μm | 47% |
| Glass Fiber | 13 μm (D) × 6 mm (L) | 16% | 13 μm (D) × 6 mm (L) | 14% | 13 μm (D) × 6 mm (L) | 15% | 13 μm (D) × 6 mm (L) | 22% | 13 μm (D) × 6 mm (L) | 16% |
| Catalyst | TBPB | 1% | TBPB | 1% | TBPB | 1% | TBPB | 1% | TPPB | 1% |
| Internal Parting Agent | Zn-st | 1% | Zn-St | 1% | Zn-St | 1% | Zn-St | 1% | Zn-St | 1% |

TABLE 2-continued

| | Comparative Example 1 | | Comparative Example 2 | | Comparative Example 3 | | Comparative Example 4 | | Comparative Example 5 | |
|---|---|---|---|---|---|---|---|---|---|---|
| | Characteristics | | | | | | | | | |
| Flexural Strength (MPa) | 75 | P | 70 | P | 67 | P | 67 | P | 78 | P |
| Flexural Modulus (GPa) | 14 | P | 10.9 | P | 8.6 | F | 7.8 | F | 10.9 | P |
| Charpy Impact Strength (kJ/m$^2$) | 7.5 | P | 5.4 | P | 3.5 | F | 5.8 | P | 3.6 | F |
| Mold Releasability | no abnormality | P | no abnormality | P | no abnormality | P | no abnormality | P | rib stuck | F |
| Molding Shrinkage (%) | 0.06 | P | 0.06 | P | 0.10 | P | 0.07 | P | 0.05 | P |
| Specific Gravity | 1.97 | F | 1.84 | F | 1.33 | P | 1.375 | P | 1.50 | F |
| Ignition Loss (g/m$^2$ · 180° C.) | 0.38 | P | 0.42 | P | 0.33 | P | 0.68 | F | 0.32 | P |

In Examples 1 to 3, the proportion of the hollow glass spheres in the BMC fell within the range of 10 to 40% by volume, and the inorganic filler to matrix volume ratio fell within the range of 1 to 2.5. All the resulting BMC molded parts satisfied the physical properties practically required of a headlight lamp reflector, i.e., (1) flexural strength of 60 MPa or higher, flexural modulus of 9 GPa or higher, and Charpy impact strength of 5 kJ/m$^2$ or higher, which relate to rigidity and impact resistance, (2) mold releasability with no sticking to a mold, which means satisfactory molding properties, (3) molding shrinkage of 0.1% or less and flexural modulus of 9 GPa or higher, which contribute to dimensional stability, (4) ignition loss (outgassing) at 180° C., which means heat resistance, and (5) specific gravity of 1.7 or smaller, which means lightness.

In contrast, the BMC molded part of Comparative Example 1 is a state-of-the-art one containing no hollow glass spheres. This is excellent in strength characteristics but heavy with a specific gravity greater than 1.7, i.e., 1.97.

Since the BMC of Comparative Example 2 has a hollow glass spheres content of less than 10% by volume (9.5%), the specific gravity of the resulting BMC molded part is as high as 1.84, showing little effect on weight reduction.

The BMC of Comparative Example 3 has a hollow glass spheres content of more than 40% (i.e., 40.5%). The resulting BMC molded part has a flexural modulus of 8.6, which is lower than the target value (9 or higher), suffers from warpage due to molding strains or deformation on aiming operation, resulting in a failure to retain the shape of the reflector. In other words, the BMC molded part has poor dimensional stability. Besides, the BMC molded part has reduced rigidity and reduced impact strength, and there is a fear of the reflector's falling off due to vibration.

The inorganic filler to matrix resin volume ratio of the BMC of Comparative Example 4 is less than 1 (i.e., 0.97) so that the flexural modulus influential on rigidity is as low as 7.8, lower than the target value (9 or higher). The low flexural modulus results in warpage due to molding strains or deformation on aiming operation. That is, the shape of the reflector cannot be retained. Moreover, the BMC molded part has poor heat resistance to cause increased outgassing during lighting. The gas solidifies by cooling and adheres to the front lens, which reduces transmission of emitted light to reduce the illuminance of the lamp and deteriorates the appearance of the lamp.

Having an inorganic filler to matrix resin volume ratio more than 2.5 (i.e., 2.52), the BMC of Comparative Example 5 lacks toughness due to shortage of the matrix resin. The resulting BMC molded part is brittle and is not easily released from the mold (poor molding properties) because it is apt to stick to the mold particularly at a portion with large release resistance, such as a rib. The BMC molded part has reduced impact resistance so that the reflector tends to fall off due to vibration. The specific gravity of the BMC molded part, 1.50, is larger than that theoretically calculated from the BMC composition, 1.45. This means that about 7% of the hollow glass spheres have been collapsed during injection molding because the BMC has an increased viscosity due to the matrix resin shortage and produces an increased shearing pressure during injection molding. It follows that the metering of the BMC is unstable, leading to a short shot, i.e., molding instability.

COMPARATIVE EXAMPLES 6 AND 7

A BMC molded part was produced in the same manner as in Example 1, except for changing the average diameter of the hollow glass spheres as shown in Table 3. Table 3 also shows the BMC composition (the same as in Example 1) and the characteristics of the resulting BMC molded part.

TABLE 3

| | Target Value | Comparative Example 6 | | Comparative Example 7 | |
|---|---|---|---|---|---|
| Avg. Diameter of HGS (μm) | 15 to 45 | 10 | | 52 | |
| | | BMC Composition (wt %) | | | |
| Unsaturated Polyester | | IPA/Man/PG | 11% | IPA/Man/PG | 11% |
| Thermoplastic Resin | | PMMA | 4% | PMMA | 4% |
| Crosslinking Agent | | styrene | 11% | styrene | 11% |
| HGS | | specific gravity: 1.1 | 13% | specific gravity: 0.45 | 13% |
| Particulate Calcium Carbonate | | avg. particle size: 6 μm | 44% | avg. particle size: 6 μm | 44% |
| Glass Fiber | | 13 μm (D) × 6 mm (L) | 15% | 13 μmm (D) × 6 mm (L) | 15% |

TABLE 3-continued

|  | Target Value | Comparative Example 6 | | Comparative Example 7 | |
|---|---|---|---|---|---|
| Catalyst |  | TBPB | 1% | TBPB | 1% |
| Internal Parting Agent |  | Zn-St | 1% | Zn-St | 1% |
|  |  | Characteristics |  |  |  |
| Flexural Strength (MPa) | ≧60 | 75 | P | 53 | F |
| Flexural Modulus (GPa) | ≧9 | 10.5 | P | 8.7 | F |
| Charpy Impact Strength (kJ/m²) | ≧5 | 7.2 | P | 5.1 | P |
| Releasability | no sticking | no abnormality | P | sticking | F |
| Specific Gravity | ≦1.7 | 1.75 | F | 1.5 | P |

The hollow glass spheres used in Comparative Example 6 are so small with an average diameter of 10 μm that they are strong against pressure but have a large wall thickness, resulting in a specific gravity as large as 1.1. Therefore, the specific gravity of the resulting BMC molded part (1.75) is larger than the target value (1.7 or less), indicating a failure to achieve weight reduction.

On the other hand, the hollow glass spheres used in Comparative Example 7 are too large (average diameter: 52 μm) to withstand the shearing pressure during injection molding reaching 30 to 40 MPa. As a result, about 40% of the hollow glass spheres are collapsed, which frequently causes short shots, i.e., molding instability. The specific gravity of the resulting BMC molded part (i.e., 1.5) clears the target value (i.e., 1.7 or smaller) but is larger than a theoretical one by about 0.2. This means that the BMC fails to produce injection molded parts as designed. In addition, the BMC molded part shows considerable reduction in rigidity (flexural modulus) and flexural strength and is therefore unacceptable as a substrate of a lamp reflector for use in vehicular lamps.

The present invention provides a lamp reflector of which the substrate has a reduced weight while retaining the favorable characteristics of a BMC molded part (i.e., heat resistance, rigidity, and reflection efficiency) by using a BMC containing a specific amount of hollow glass spheres as an inorganic filler.

In a preferred embodiment of the present invention in which the BMC has a specific inorganic filler to matrix resin volume ratio, there is provided a lamp reflector with a further reduced weight while securely retaining the characteristics of a lamp reflector prepared from a conventional BMC.

In another preferred embodiment of the invention in which the hollow glass spheres has a specific average diameter, there is provided a lightweight lamp reflector with further improved characteristics (heat resistance, rigidity, and reflection efficiency).

What is claimed is:

1. A lamp reflector having a substrate prepared by injection molding a bulk molding compound comprising a matrix resin mainly comprising an unsaturated polyester resin and glass fiber as an inorganic filler, the bulk molding compound further comprising hollow glass spheres as an additional inorganic filler in an amount of 10 to 40% by volume based on the bulk molding compound, wherein:

the bulk molding compound has a total inorganic filler content in a volume ratio of 1.0 to 2.5 to the matrix resin; and the hollow glass spheres have an average diameter of 15 to 45 μm.

2. A lamp reflector according to claim 1, wherein the hollow glass spheres have a pressure strength of at least 40 MPa.

3. A lamp reflector according to claim 1, wherein the hollow glass spheres are made of chemically stable insoluble glass.

4. A headlight for a vehicle, comprising a lamp shell, a front lens, a light source, and a reflector, the reflector comprising:

a substrate comprising a mixture of unsaturated polyester resin, glass fiber, and hollow glass spheres in the amount of 10 to 40% by volume of the substrate; and a reflective coating on an outer surface of the substrate facing the light source, wherein:

the glass fiber and hollow glass spheres comprise inorganic filler;

the substrate has a total inorganic filler content in a volume ratio of 1.0 to 2.5 to the polyester resin; and the hollow glass spheres have an average diameter of 15 to 45 μm.

5. The headlight according to claim 4, wherein the hollow glass spheres have a pressure strength of at least 40 MPa.

6. The headlight according to claim 4, wherein the hollow glass spheres are made of chemically stable insoluble glass.

7. A headlight for a vehicle, comprising a lamp shell, a front lens, a light source, and a reflector, the reflector comprising:

a substrate comprising a mixture of unsaturated polyester resin, glass fiber, and hollow glass spheres in the amount of 10 to 40% by volume of the substrate; and a reflective coating on an outer surface of the substrate facing the light source, wherein:

the glass fiber and hollow glass spheres comprise inorganic filler;

the substrate has a total inorganic filler content in a volume ratio of 1.0 to 2.5 to the polyester resin; and the hollow glass spheres have an average diameter of 70 μm or smaller.

8. A lamp reflector according to claim 7, wherein the hollow glass spheres have a pressure strength of at least 40 MPa.

9. A lamp reflector according to claim 7, wherein the hollow glass spheres are made of chemically stable insoluble glass.

* * * * *